(12) United States Patent
Vignali et al.

(10) Patent No.: US 6,271,157 B1
(45) Date of Patent: Aug. 7, 2001

(54) FORMULATIONS BASED ON WATER SOLUBLE COMPOUNDS OF TITANIUM AND CHROMIUM COMBINED WITH ANTIMONY OR TUNGSTEN OR MIXTURES THEREOF SUITABLE FOR COLORING CERAMIC MANUFACTURED ARTICLES AND RELEVANT HIGH TEMPERATURE COLORING PROCESS

(75) Inventors: Graziano Vignali, Via della Pace, 2, 40037 Sasso Marconi (IT); Fabrizio Guizzardi, Bologna (IT)

(73) Assignee: Graziano Vignali, Sasso Marconi Bo (IT)

( * ) Notice: Subject to any disclaimer, the term of this patent is extended or adjusted under 35 U.S.C. 154(b) by 0 days.

(21) Appl. No.: 09/259,059

(22) Filed: Feb. 26, 1999

(30) Foreign Application Priority Data

Mar. 5, 1998 (IT) .............................. MI98A0444

(51) Int. Cl.⁷ ........................... C04B 41/50; C04B 41/45; C04B 41/46; C04B 33/34; C04B 33/14
(52) U.S. Cl. .............................. 501/1; 501/141; 501/145; 501/150; 106/439; 106/441; 264/6.43; 264/600; 264/601; 264/602; 264/644
(58) Field of Search ................... 501/1, 94, 126, 501/134, 141, 145, 150; 106/439, 441; 264/643, 600, 601, 602, 644, 680

(56) References Cited

U.S. PATENT DOCUMENTS 5,587,347 * 12/1996 Hong et al. ........................... 501/141

FOREIGN PATENT DOCUMENTS

| 2012304 | 9/1971 | (DE) . |
| 2605651 | 8/1977 | (DE) . |
| 704411 | 4/1996 | (EP) . |
| 9738952 | 10/1997 | (WO) . |

OTHER PUBLICATIONS

Sprechsaal (1986), 119(10)9224 (Abstract) (No Month).

European Search Report, May 18, 1998, Examiner Rosenberger, J.

* cited by examiner

Primary Examiner—Michael Marcheschi
(74) Attorney, Agent, or Firm—Hedman & Costigan, P.C.

(57) ABSTRACT

Composition whereby ceramic manufactured articles, obtained by moulding a conventional ceramic mixture without added $TiO_2$., are colored from yellow to orange, said composition consisting of an aqueous solution of inorganic compounds or organic complexes of titanium and chromium combined with antimony or tungsten or mixtures thereof, in quantities corresponding to 2 to 6% by wt. Ti, 3 to 12% Sb (or 4 to 14% tungsten) and 0.2 to 2.5% chromium.

15 Claims, No Drawings

FORMULATIONS BASED ON WATER SOLUBLE COMPOUNDS OF TITANIUM AND CHROMIUM COMBINED WITH ANTIMONY OR TUNGSTEN OR MIXTURES THEREOF SUITABLE FOR COLORING CERAMIC MANUFACTURED ARTICLES AND RELEVANT HIGH TEMPERATURE COLORING PROCESS

FIELD OF THE INVENTION

The present invention relates to compositions suitable for colouring ceramic manufactured articles and the relevant colouring process.

In particular, the compositions of the invention consist of aqueous solutions of salts or organic complexes of titanium and chromium, combined with antimony or tungsten or mixtures thereof, which allow the obtainment of ceramic manufactured articles with shades ranging from light yellow to orange yellow to mustard.

Furthermore, to obtain particular shades, said solutions may be mixed with solutions of other cations.

STATE OF THE ART

The use of coloured ceramic manufactured articles as well as the compositions and procedures adopted to obtain the relevant colours have been known since long. One of the methods most commonly used is based on the addition of powdered pigments, in particular inorganic oxides and mineral colouring matters, to the ceramic mixture (vitrified stoneware) before firing. The ceramic manufactured article is thus coloured through its whole thickness, although with large consumption of colouring matter, which is the most expensive component.

According to a used procedure, the surface of the ceramic material is caused to absorb, either after partial burning (as disclosed e.g. in German patent 2,012,304) or simply after press moulding and before burning (as disclosed e.g. in Swiss patent 575,894), an aqueous solution of inorganic salts or metal complexes (as disclosed e.g. in Sprechsal, vol. 119, No. 10, 1986; in EP 0704411 and in patent PCT WO 97/38952), which become stable colours at high temperature during the firing cycle of the ceramic manufactured article.

The aqueous solution is applied to the ceramic material, e.g. by immersion, spraying, disk techniques, and silk-screen techniques.

The aqueous solution is applied to the ceramic material before final firing. This procedure is particularly advantageous because it allows the colouring of very thin layers: therefore, it is widely used for flat manufactured articles (such as e.g. floor and wall tiles).

Another problem to be solved when using colours in an aqueous solution is the obtainable depth of colour penetration into the ceramic material. In fact, it was experimentally found that the depth of penetration depends on several parameters, such as the viscosity and surface tension of the colouring solution, the application temperature, the quantity of water sprayed on the manufactured article once the colouring solution has been applied, the application technique.

Of cardinal importance is the application technique: in particular, the quantity of colouring solution that may be applied by disk and spraying techniques is as high as 400 to 600 g/m2; by silk-screen type techniques it usually amounts to 100 to 200 g/m2 and sometimes even to 400 g/m2, when thickened screens made of a small number of threads are used.

Silk-screen type techniques are very much in demand, being the only techniques allowing graphic decorations and drawings, and requiring lower quantities of colouring matter. By using said techniques, the colouring solutions are to be thickened with appropriate thickening agents, e.g. modified glucomannans, starch and modified starch derivatives, cellulose and modified cellulose derivatives, or other polymeric substances, soluble or dispersible in an aqueous solution.

The colour penetrates into the ceramic material before firing by using relatively high quantities of water after application of the colouring solution. However, the resulting colours are less intense than those obtained using other techniques.

Colour penetration into the material is particularly important in the case of "smoothed" vitrified stoneware tiles.

The term "smoothed" means that the vitrified stoneware surface has been abraded with diamond wheels by 0.8 to 1.5 mm, and subsequently smoothed or polished with appropriate felt until obtaining a glassy surface.

It follows that colour penetration into stoneware articles to be smoothed after firing must reach a depth of 1.6 mm min.

Other methods have been developed for smoothing very thin surface layers of the manufactured article, in the order of 1 to 10 micron.

TECHNICAL PROBLEM

Considering that it is very simple to colour ceramic materials by disk techniques, spraying and silk-screen techniques, the ceramic industry is highly interested in finding new substances to be used therewith.

As concerns said new substances, the following technical problems are to be solved. The substances must become stable colours at a high temperature; the manufactured article has to be coloured in the desired shades, on its surface and to a depth of 1.6 mm min from its surface, without too high consumption of colouring matter.

Unfortunately, very few are the colours available so far. In particular, the lack of yellows and orange yellows, obtainable in the presence of other colours, is deeply felt, especially by the industry of vitrified stoneware, which must propose ever new aesthetic solutions.

In fact, as disclosed in patent application PCT WO 97/38952, the whole range of yellows, oranges, orange beiges may be obtained using antimony/chromium, zirconium/chromium, zinc/chromium, manganese/chromium solutions, exclusively on supports modified by the addition of 0.5 to 10% by wt. titanium oxide, preferably 1% by wt. min. However, titanium oxide heavily affects the development of colours not included in the aforesaid range of yellows and oranges, which may be obtained with the already known aqueous solutions of iron, cobalt, nickel, vanadium, chromium, manganese, copper, ruthenium, palladium, zirconium, gold, and mixtures thereof, especially when used in low concentrations, or by the silkscreen technique, to obtain pale colours.

By way of example, Table 1 illustrates some tests carried out to prove the main effects that titanium oxide addition to the ceramic mixture exerts on the development of the (typical) colours of the aforesaid cations.

All tests were performed according to the following procedure:

a) drying six 33×33 cm supports (two of mixture A, two of mixture B and two of mixture C) at 100° C. to a water residue of 0.5% by wt. max.;
b) cooling said supports to room temperature;
c) letting fall an amount of mg 185+/−15 of colouring solution in a single point, within an area of approx. 10 cm2, of each support;
d) equalizing the supports at room temperature for 2 h and in a thermo-ventilated oven at 60° C. for 2 additional h to homogenize the solutions absorption;
e) kiln firing according to a standard ceramic cycle;
f) smoothing each support of mixtures A, B and C;
g) recording the support colour before and after smoothing.

TABLE 1

| Test No. | Solution (% as element) | Mixture type | *Colour before smoothing<br>C M Y K values<br>***L*; a*; b* values | *Colour after smoothing<br>C M Y K values<br>***L*; a*; b* values |
|---|---|---|---|---|
| 1 | 0.4% Gold | A | Garnet<br>25-70-65-25<br>37.5; 14.6; 10.3 | Parma red<br>17-47-39-7<br>56.5; 13.5; 2.1 |
| 2 | 0.4% Gold | B | Reddish violet<br>25-57-49-19 | Cobalt violet<br>22-47-40-12<br>63.4; 8.3; 3.6 |
| 3 | 0.4% Gold | C | Violet<br>30-64-57-27<br>41.9; 12; 4.8 | Violet<br>27-49-40-18<br>51.4; 7.4; 0.6 |
| 4 | 8% Vanadium | A | Grey beige<br>30-31-44-18<br>56.4; 2.2; 6.4 | Lightgrey beige<br>15-19-29-4<br>69.3; 2.9; 9.9 |
| 5 | 8% Vanadium | B | Ocher brown<br>25-31-47-14 | Dark beige<br>15-25-42-5<br>62.7; 3.9; 17.2 |
| 6 | 8% Vanadium | C | Pozzuoli red<br>30-50-69-27<br>45.1; 8.1; 17.6 | Ocher brown<br>19-45-68-15<br>54.5; 9.1; 20.8 |
| 7 | 10% iron | A | Havana brown<br>29-57-22-25<br>39.7; 13.8; 15.5 | Burnt umber<br>22-46-64-18<br>46.8; 9.8; 21.1 |
| 8 | 10% Iron | B | Burntumber<br>29-53-61-26 | Raw sienna<br>15-54-85-22<br>48.6; 9.1; 26.9 |
| 9 | 10% Iron | C | Chocolate<br>33-54-71-31<br>38.9; 8.4; 20.4 | Tobacco brown<br>28-44-73-27<br>46.3; 5.8; 23.1 |
| 10 | 5.8% Cobalt | A | indigo<br>62-67-22-25<br>34.7; −3.0; −20.9 | Light ultramarine blue<br>59-13-9-7<br>42.9; −4.1; −27.4 |

| Test No. | Solution (% as element) | Mixture type | *Colour before smoothing<br>C M Y K values<br>***L*; a*; b* | *Colour after smoothing<br>C M Y K values<br>***L*; a*; b* |
|---|---|---|---|---|
| 11 | 5.8% Cobalt | C | Manganese blue<br>65-49-22-24<br>39.7; −8.3; −20 | Turquoise blue<br>37-24-27-11<br>55.9; −6.3; −5.3 |
| 12 | 1.5% Cobalt | A | Light ultramarine blue<br>60-43-20-18<br>41.2; 4.2; −23.2 | Sky blue<br>39-22-10-4<br>60.6; −5; −13.9 |
| 13 | 1.5% Cobalt | C | Peacock blue<br>53-38-23-18<br>46.8; −8.7; −14.5 | Water green<br>23-17-23-6<br>69.5; −4.2; 2.7 |
| 14 | 6% Ru | A | Deep black<br>55-50-51-41<br>23.6; −0.6; −0.7 | Black<br>63-61-62-55<br>14.5; −2; −0.3 |
| 15 | 6% Ru | B | black<br>43-41-48-29 | Matt black<br>61-64-66-59<br>20.8; −2.1; 2.6 |
| 16 | 6% Ru | C | Pinkish black<br>58-62-61-53<br>21.3; −0.3; 2.6 | Pinkish black<br>59-60-62-54<br>20.6; −0.7; 2.2 |
| 17 | 1.5% Ru | A | Blackish grey<br>53-50-50-41<br>28.5; −1.5; −0.2 | Anthracite grey<br>47-35-49-27<br>41.2; −4.1; 3.4 |
| 18 | 1.5% Ru | C | Pinkish dark grey<br>48-48-55-38<br>31.4; −0.4; 5.7 | Tobacco brown<br>36-42-58-28<br>41.3; 2; 12.9 |
| 19 | 8.9% Cr | A | Cobalt green<br>42-52-60-24<br>43.9; −4.8; 10.3 | Olive green<br>46-31-65-27<br>43.1; −3.2; 12.4 |

TABLE 1-continued

| 20 | 6.9% Cr | B | Greyish green<br>42-35-57-27<br>48.4; −0.8; 17.3 | Dove grey<br>36-36-60-25 |
| --- | --- | --- | --- | --- |
| 21 | 8.9% Cr | C | Greyish green<br>44-38-58-29<br>42.8; 4.8; 8.8 | Tobacco brown<br>24-39-70-21<br>49.1: 2.7; 23 |
| 22 | 2.2% Cr | A | Olive green<br>34-34-60-24<br>49.8; 0.2; 14.0 | Beige<br>13-18-35-3<br>68.9; 2.5; 14.5 |
| 23 | 2.2% Cr | C | Ocher brown<br>24-42-67-20<br>54.5; 5.3; 24.4 | Sand<br>13-20-50-3<br>71.1; 3.8; 28 |

*Cf. Colour Atlas, $2^{nd}$ page of the cover; Italian-English dictionary; II Regazzini III edition; ed. Zanichelli; ISBN 88-08-09960-1
**Values of cyano, magenta, yellow, black primary colours, which constitute the colour of each test. The four colourimetric coordinates of each test were determined by a computing system consisting of scanner Saphir Linotype Hell, display Apple 21"with Color Profile Syns 2.1.2., RGB standard, power computing with operating system Apple System MAC OS 8, colour recording programme adobe Photoshop 4.0.
***The reported values have been obtained by the instrument Spectra Pen of Dr. Lange. The instrument has been adjusteed with a sample of white provided by the constructor and showing the following values x = 92.3; y = 97.4; z = 104.4. The sample of white provided by the constructor has been adjusted according to the norm DIN 55350 section 18, 4.1.2 through standard LZM 224 for Spectra Pen. Certificate number of the master standard "Opal BAM S1E 0504/A" (BAM = German Federal Bureau analysis and methods). ).
For the measurement of the values the chromatic system L* a* b* has been adopted according to the norm DIN 6174 (Colorimetric evaluation of color differences of surface colours according to the CIELAB formula). The L*-axis indicates the lightness of a colour, the a*-axis the red-green share and the b*-axis the yellow-blue share. The L*-values are always positive, with 0 for ideal black and 100 for ideal white colours. Red shades have positive a*-values, green shades negative ones. Yellow shades have positive b*-values, blue shades negative ones.

The compositions (% by weight) of the mixtures used in the tests are reported below.

A*) $SiO_2$ 64.4%, $Al_2O_3$ 21.8%, $K_2O$ 3.8%, $Na_2O$ 0.8%, CaO 0.6%, MgO 0.1%, $TiO_2$ 0.3%, $Fe_2O_3$ 0.2%, $ZrSiO_4$ 5%, $H_2O$ q.s. to 100%.

B) $SiO_2$ 64.4%, $Al_2O_3$ 21.8%, $K_2O$ 3.8%, $Na_2O$ 0.8%, CaO 0.6%, MgO 0.1%, $TiO_2$ 1.3%, $Fe_2O_3$ 0.2%, $ZrSiO_4$ 4%, $H_2O$ q.s. to 100%.

C) $SiO_2$ 64.4%, $Al_2O_3$ 21.8%, $K_2O$ 3.8%, $Na_2O$ 0.8%, CaO 0.6%, MgO 0.1%, $TiO_2$ 3.3%, $Fe_2O_3$ 0.2%, $ZrSiO_4$ 2%, $H_2O$ q.s. to 100%.

* The analysis of mixture A reports 0.3% $TiO_2$. Actually, it is the $TiO_2$ equivalent of the titanium present in the raw materials as titanium oxide and other titanium derivatives.

The solutions used consist of vanadium glycolate, iron ammonium-2-hydroxy propane-tricarboxylate, cobalt bisethanoate, ruthenium glycolate, chromium trisethanoate.

As may be inferred from the results of Table 1, there is a deeply felt problem concerning the obtainment of shades from yellow to orange on conventional ceramic mixtures, which correctly develop, in the known manner, the colours deriving from iron, cobalt, chromium, manganese, copper, ruthenium, palladium, zirconium, gold, vanadium, nickel and mixtures thereof.

In fact, as may be inferred from the experimental results of Table 1, in the presence of high quantities of titanium oxide in the ceramic mixture, the colours of the aforesaid cations do not develop correctly, but are altered; only as example compared tests 12 and 13, smoothed surface, colour based on Cobalt, the b* value is negative (−13,9) with standard support, therefore a blue colour, while on support with 3% of $TiO_2$ b* is positive (2,7), therefore a shifting towards the yellow that gives a colour near the green.

It is an object of the present invention to provide a colouring formulation for ceramic products in the form of an aqueous solution, suitable for obtaining aesthetically excellent shades from yellow to orange on a ceramic material obtained from a conventional mixture without added $TiO_2$, which, therefore, can be coloured in the traditional shades with the known metal cations mentioned above.

This means that a single manufactured article can be coloured not only in the shades from yellow to orange using the formulation of the invention in some zones, but also, in different zones, with other traditional shades using formulations already known, in particular by the silk-screen technique.

A particular advantage of the invention is the possibility of obtaining a manufactured article coloured in shades from yellow to orange from a conventional ceramic mixture. Therefore, there is no need of using a different ceramic mixture added with $TiO_2$, unsuitable for traditional colouring. The use of a single ceramic mixture to produce manufactured articles in different colours is a clear advantage for a plant running because it is not necessary to clean the apparatus for molding and drying the ceramic mixture as it occurs when in the manufacture of different articles different ceramic mixtures are used.

The Applicant, who has full-fledged experience in the production and sale of colouring matters for ceramic tiles, has now found that titanium and chromium inorganic salts or organic complexes in combination with inorganic salts or organic complexes of antimony or tungsten or mixtures thereof in water solutions or in water solutions mixed with alcohols or other water-miscible organic solvents, can be used to obtain—after firing—shades varying from orange yellow to orange, to orange beige, on manufactured articles consisting of a conventional ceramic mixture without added $TiO_2$. The ceramic mixture considered herein may contain the Ti that is present in small quantities in the starting mineral materials (clay, kaolin) in various forms (oxide, silicate) for a total amount generally of 0.5% by wt. max., expressed as $TiO_2$, and in some cases up to 0.7% max.

The solutions object of the present invention contain from 2 to 6% by wt. of titanium as element; from 3 to 12% of antimony or from 4 to 14% of tungsten as elements; from 0.2 to 2.5% of chromium as element.

Particularly useful solutions contain from 5% to 12% Sb and from 6% to 10% by wt. of W.

The resulting shades depend on the titanium/antimony/chromium or titanium/tungsten/chromium ratio by wt. (as elements) in the solution: by increasing the chromium concentration, colours gradually turn from orange-yellow to orange-beige.

The aqueous or hydroalcoholic solutions of the invention are particularly useful for colouring tiles of vitrified stoneware, also by silk-screen application techniques.

It is, therefore, a fundamental feature of the present invention to use titanium and chromium inorganic salts or organic complexes in combination with antimony or tungsten or mixtures thereof in water solutions or water solutions mixed with organic solvents to treat, before firing, ceramic articles that, after firing, will be yellow, orange yellow, yellow ocher, orange beige coloured.

It is also possible to use ammonium or alkaline or alkaline-earth salts of chromic or tungstic or antimonic or sulfoantimonic acid.

Sulphuric, hydrochloric, hydrofluoric and nitric acid salts are particularly cheap and suitable for obtaining the desired colours, but suffer from the disadvantage of releasing corrosive vapours during the firing cycle. It follows that kilns are to be provided with exhaust gas neutralisation equipment. Therefore, whenever possible, it is preferable to use organic complexes that, during the firing cycle of the treated products, undergo thermal decomposition yielding water and carbon dioxide. Particularly useful are the salts of mono- or polycarboxylic organic acids, either aliphatic or aromatic, containing 1 to 18 carbon atoms, optionally with one to five hydroxylic or aminic or thiolic substituents in the aliphatic chain or in the aromatic nucleus.

The following compounds of Ti, Cr, Sb, W are reported by way of example, not of limitation, of the present invention: salts of acetic, formic, propionic, butyric, lactic, glycolic, tartaric, citric, oxalic, maleic, citraconic, ethylenediaminetetraacetic, fumaric, gluconic, glycine, aminoadipic, aminobutyric, aminocaproic, aminocaprylic, 2-amino-1-hydroxy-butyric, amino isobutyric, aminolevulinic, thioglycolic, salicylic acids.

In particular the following compounds are suitable:
Antimony

Sb lactate, Sb/K citrate, K or Na exafluoroantimoniate, K or Na antimoniate, Sb/K tartrate ($C_8H_4K_2O_{12}Sb_2$), Sb tartrate, Sb triacetate, sulfoantimoniates (obtained from alcaline solution of $Sb_2S_5$), Sb/Na tartrate ($C_8H_4Na_2O_{12}Sb_2$), Sb dimercaptosuccinate, sodium stibogluconate ($C_{12}H_{17}NaO_{12}Sb_2 \cdot 9H_2O$), Sb/Na thioglycolate ($C_4H_4NaO_4S_2Sb$), ammonium antimony tungsten oxide, antimony sodium di-hydroxy-succinate, Sb/K oxalate ($C_6K_3SbO_{12}$), Sb sulfate.
Tungsten Ammonium tetrathiotungstate, Na or K salt of tungstosilic acid, tungstophosphoric acid, sodium/ammonium tungsten citrate.
Titanium Titanium citrate neutralized or not neutralized with sodium or potassium or ammonium, titanium oxalate neutralized or not neutralized with sodium or potassium or ammonium, Titanium lactate neutralized or not neutralized with sodium or potassium or ammonium.
Chromium Chromium triacetate, chromium sodium citrate, chromium basic acetate, chromium (III) potassium sulphate, potassium chromium (III) oxalate, alkaline chromates, chromium 2-hydroxy-1,2,3-propanetricarboxylate, mixed citrates of Cr with K, Na or $NH_4$. Further inorganic compounds: $CrCl_3$, $CrCl_2$, $Cr(NO_3)_3$.

According to a further feature of the invention, it is possible to mix titanium/antimony/chromium and titanium/tungsten/chromium inorganic salts or organic complexes in water solutions or water solution with organic solvents, with other salts or organic complexes of metals known for coloring ceramic materials, to obtain colours or shades not yet available.

The typical process for applying colouring compositions of the invention consists of the following steps:

a) drying at 100° C. of the moulded article to be coloured to a water residue of 0.5% by wt. max.;

b) optional pretreatment of the dried product with water up to a max. quantity of 300 g/m2 of the ceramic manufactured article;

c) treatment of the pretreated product with a colouring aqueous solution in a quantity of 30 to 600 g/m2 of the final coloured surface;

d) optional post-treatment of the treated product with water up to a max. quantity of absorbed water of 300 g/m2 of the treated product;

e) equalization of the post-treated product at room temperature for 8 h to homogenize the absorption of the solution;

f) kiln firing according to the usual ceramic cycle.

The colour penetration obtained with the process according to the invention reaches a depth up to 2 mm. Consequently the coloured stoneware, for instance tiles, can be subsequently smoothed and polished after a thin surface of 0.8 to 1.5 mm has been abraded.

The following example is conveyed by way of indication, not of limitation, of the, prospective embodiments of the invention.

EXAMPLE 1

A series of tests was carried out using the ceramic mixture (% by wt.) indicated below:

SiO2 64.4%, Al2O3 21.8%, K2O 3.8%, Na2O 0.8%, CaO 0.6%, MgO 0.1%, TiO2. 0.5%, Fe2O3 0.2%, ZrSiO4 5%, H2O q.s. to 100%.

The 0.5% TiO2 present in the mixture is entirely due to the titanium oxide or other titanium derivatives present in the starting clays.

The procedure adopted was as follows: some 33×33 cm tiles were press moulded, dried at 100° C. to a water residue of 0.1% (weight loss after 4 h at 120° C.), allowed to cool to room temperature, sprayed with 50 g/m2 distilled water (pretreatment). Then, an amount of mg. 185+/−15 of colouring solution was let fall in a single point, within an area of approx. 10 cm2, of each support.

The treated tiles were allowed to stand 8 h at room temperature (equalization) and fired in a roll-type kiln according to a standard firing cycle of vitrified stoneware (T 1200° C. max.).

After firing, a tile was divided into sections, and colour penetration was measured by optical microscope. Another tile was smoothed with diamond wheels, with removal of a 1.2 mm layer. At the end of said operation, the colour was recorded. The data concerning the parameters used in the various tests are conveyed in Table 2.

Tests Nos 40, 41 and 42(absence of Ti in the colouring solution) are indicated for comparison.

TABLE 2

| (1) | (2) Elements (% by wt.) in the solution used | | | (3) | *Surface colour before smoothing **C M Y K values ***L*; a*; b* values | *Surface colour after smoothing **C M Y K values ***L*; a*; b* values |
|---|---|---|---|---|---|---|
| | Ti | Sb | Cr | | | |
| 24 | 4 | 7 | 0.25 | 1.8 | Slighty more intense than after smoothing<br>13-21-44-3<br>74.6; 4.0; 23.9 | Naples yellow<br><br>10-15-36-2<br>75.5; 3.1; 21.0 |
| 25 | 4 | 7 | 0.5 | 1.8 | Slighty more intense than after smoothing<br>13-28-53-5<br>69.8; 7.1; 28.9 | Deep cadmium yellow<br><br>10-20-46-2<br>72.4; 4.9; 25.1 |
| 26 | 4 | 7 | 1 | 1.8 | Slighty more intense than after smoothing<br>13-38-66-5<br>63.7; 10.2; 32.2 | Deep chrome yellow<br><br>11-31-57-4<br>66.8; 8.0; 28.9 |
| 27 | 4 | 7 | 1.5 | 1.8 | Slighty more intense than after smoothing<br>13-44-71-8<br>59.8; 11.5; 32.9 | Orange chromeyellow<br><br>11-36-64-5<br>63.0; 9.6; 30.4 |
| 28 | 4 | 7 | 2 | 1.8 | Slighty more intense than after smoothing<br>16-38-71-8<br>61.5; 9.1; 38.8 | Yellow ocher<br><br>11-41-68-6<br>59.8; 10.6; 30.5 |
| 29 | 2 | 9 | 0.25 | 1.8 | Naples yellow<br>12-18-41-3<br>75.1; 3.3; 21.4 | Light Naples yellow<br>10-13-31-2<br>76.8; 2.1; 18.1 |
| 30 | 2 | 9 | 1 | 1.8 | Yellow ocher<br>13-31-59-5<br>65.7; 7.7; 28.5 | Sand<br>11-22-47-3<br>70.5; 4.7; 24.2 |
| 31 | 2 | 9 | 2 | 1.8 | Ocher brown<br>16-40-65-11<br>58.5; 9.3; 28.1 | Deep sand<br>12-32-58-5<br>64.4; 7.2; 27.1 |
| 32 | 2 | 11 | 0.25 | 1.8 | Naples yellow<br>13-19-42-3<br>74.3; 3.0; 20.8 | Light Naples yellow<br>41-31-58-6<br>76.6; 1.5; 16.5 |
| 33 | 2 | 11 | 1 | 1.8 | Light yellow ocher<br>14-31-58-6<br>66.8; 7.1; 28.0 | Light sand<br>12-17-42-3<br>72.2; 3.5; 21.1 |
| 34 | 3 | 7 | 0.25 | 1.8 | Deep Naples yellow<br>13-20-45-4<br>74.3; 3.8; 23.1 | Naples yellow<br>10-14-34-2<br>76.3; 2.2; 19.4 |
| 35 | 3 | 7 | 1 | 1.8 | Deep cadmium yellow<br>12-38-63-6<br>63.7; 9.7; 31.2 | Indian yellow<br>11-29-53-4<br>67.6; 6.5; 26.9 |
| 36 | 3 | 7 | 2 | 1.8 | Deep yellow ocher<br>16-43-70-12<br>56.8; 10.9; 30.4 | Deep yellow ocher<br>13-38-63-6<br>60.1; 8.7; 26.8 |
| 37 | 4 | 5 | 1 | 1.8 | Deep chrome yellow<br>13-37-64-7<br>63.8; 10.2; 31.5 | Chrome yellow<br>12-29-56-5<br>67.1; 6.9; 27.8 |
| 38 | 5 | 5 | 0.5 | 1.8 | Deep cadmium yellow<br>11-29-54-4<br>69.8; 7.4; 29.5 | Deep cadmium yellow<br>10-24-51-3<br>71.3; 5.8; 26.6 |
| 39 | 5 | 5 | 1.5 | 1.8 | Yellow ocher<br>17-43-72-15<br>60.4; 12.5; 34.7 | Orange chromeyellow<br>11-35-65-5<br>60.8; 7.4; 23.0 |
| 40 | 0 | 7 | 0.5 | 1.8 | Beige<br>15-22-44-5<br>73.7; 2.3; 17.7 | Beige<br>15-17-35-4<br>74.6; 2.3; 18.7 |
| 41 | 0 | 7 | 2 | 1.8 | Deep sand<br>18-34-53-10<br>62; 4.9; 22.5 | Deep sand<br>15-23-42-5<br>68.0; 3.6; 21.7 |
| 42 | 0 | 5 | 1.5 | 1.8 | Sand<br>19-29-51-9<br>67.9; 3.6; 22.1 | Sand<br>15-22-40-5<br>69.8; 3.2; 20.8 |
| 48 | 1 | 7 | 0.25 | 1.8 | Very light sand<br><br>76.0; 2.8; 19.8 | Rather uncolorless<br><br>77.81; 1.85; 15.36 |
| 51** | 6** | 2 | 0.5 | 1.8 | Yellow beige<br><br>73; 4.6; 28.1 | Light beige grey<br><br>72.75; 2.49; 21.51 |
| 52 | 6 | 2 | 1.5 | 1.8 | Light ocher brown<br><br>65.2; 7.5; 28.4 | Light tobacco brown<br><br>65.16; 4.56; 25.74 |
| 53 | 2 | 12 | 0.25 | 1.8 | Very light sand<br><br>76.3; 2.6; 19.1 | Very light sand<br><br>76.25; 2.35; 17.16 |

TABLE 2-continued

| | | | | | | |
|---|---|---|---|---|---|---|
| 55 | 5 | 5 | 0.1 | 1.8 | Rather colourless<br><br>78.6; 1.4; 18.6 | Rather colourless<br><br>77.52; 1.52; 16.97 |
| 56 | 4 | 5 | 3 | | Tobacco brown<br><br>56.3; 8.8; 26.7 | Heavy beige<br><br>55.95; 7.23; 24.49 |

| | (2) Elements (% by wt.) in the solution used | | | | *Surface colour before smoothing<br>**C M Y K values | *Surface colour after smoothing<br>**C M Y K values |
|---|---|---|---|---|---|---|
| (1) | Ti | W | Cr | (3) | ***L*; a*; b* values | ***L*; a*; b* values |
| 43 | 4 | 8 | 0.8 | 1.8 | 16-39-61-10<br>59.3; 9.3; 25 | Cadmium orange<br>17-32-57-9<br>64.0; 7.2; 26.0 |
| 44 | 4 | 8 | 0.4 | 1.8 | 15-32-51-6<br>64.7; 7.0; 24.7 | Cadmium yellow<br>15-25-48-5<br>70.4; 3.9; 22.8 |
| 45 | 4 | 8 | 0.2 | 1.8 | 14-25-47-5<br>69.2; 4.4; 23.7 | Naples yellow<br>14- 19-40-4<br>73.7; 2.0; 19.3 |
| 46 | 6 | 6 | 0.8 | 1.8 | 16-33-53-7<br>63.0; 7.6; 25.3 | Indian yellow<br>16-27-51-6<br>66.5; 5.5; 24.7 |
| 47 | 6 | 6 | 0.4 | 1.8 | 15-25-47-5<br>68.6; 4.2; 23.1 | Dull cadmium yellow<br>15-20-46-4<br>71.8; 2.9; 21.5 |
| 59 | 6 | 2 | 0.4 | 1.8 | Beige grey<br><br>71.4; 1.8; 20.1 | Light beige grey<br><br>72.04; 2.34; 18.94 |
| 60 | 6 | 2 | 0.8 | 1.8 | Very light sepia<br><br>66.9; 3.0; 21.3 | Very light sepia<br><br>68.07; 3.37; 20.03 |
| 61 | 3 | 10 | 0.1 | 1.8 | Grey sand<br><br>75.1; 1.4; 19.9 | Light grey sand<br><br>76.15; 1.06; 15.19 |

*;; *; see pag. 7 and 8.
(1) Test number
(2) Cations (% by wt.) in the solution used, expressed as elements. Antimony is used as antimony and sodium di-hydroxy-succinate; chromium, combined with antimony, is used as chromium hydroxy-bisethanoate; chromium, combined with tungsten, is used as chromium 2-hydroxy-1,2,3propanetri-carboxylate; titanium is used as titanium-beta-hydroxypropanoate; Tungsten is used as sodium tungstate.
(3) colour penetration (mm). Tests 48–51–52–53–55–56–59–60 and 61, which cation concentrations are not in claimed ranges, are showed to demonstrate the concentration importance.

What is claimed is:

1. A composition for colouring ceramic articles obtained from a standard ceramic mixture not modified through TiO$_2$ addition, wherein the articles are coloured from yellow to orange at the surface and to a penetration depth of at least 1 mm, said composition consisting of a mixture of (a) inorganic or organic compounds of titanium and chromium, (b) inorganic or organic compounds of antimony or tungsten or mixture thereof, and (c) a water solution or a water/hydro-soluble organic solvent mixture, wherein the solution contains the components expressed as elements in weight percent, in the following ranges: elemental titanium in an amount of 2–6% and elemental chromium in an amount of 0.2–2.5% and further contains either elemental antimony in an amount of 3–12% or elemental tungsten in an amount of 4–14% or mixtures thereof.

2. A composition as claimed in claim 1, wherein antimony and/or tungsten are present in quantities corresponding to 5%–12% elemental antimony and 6%–10% elemental tungsten.

3. The composition as claimed in claim 1, wherein the titanium, chromium, antimony, and tungsten compounds are selected from the group consisting of salts of aliphatic or aromatic mono- or polycarboxylic organic acids, containing 1 to 18 carbon atoms, optionally substituted with one to five hydroxyl groups or amino or thiol substitutents, in the aliphatic chain or on the aromatic nucleus.

4. The composition as claimed in claim 1, wherein the tungsten compound is an alkaline or alkaline-earth or ammonic salt of tungstic acid.

5. The composition as claimed in claim 1, wherein the antimony compound is an alkaline or alkaline-earth or ammonic salt of antimonic acid.

6. A process for colouring ceramic manufactured articles obtained by moulding a ceramic mixture not modified through TiO$_2$ addition, using the composition as claimed in claim 1, consisting of the following steps:

a) drying at 100° C. of the moulded article to be coloured to a water residue of 0.5% by wt. max.;

b) optional pretreatment of the dried product with water up to a max. quantity of 300 g/m$^2$ of the ceramic manufactured article;

c) treatment of the product coming from step a) or b) with a colouring aqueous solution in a quantity of 30 to 600 g/m$^2$ of the final coloured surface;

d) optional post-treatment of the treated product with water up to a max. quantity of absorbed water of 300 g/m$^2$ of the treated product;

e) equalization of the post-treated product coming from step c) or d) at room temperature for 8 h to homogenize the absorption of the solution; and f) kiln firing.

7. The process as claimed in claim 6, wherein the colouring solution added with thickening agents is applied to the ceramic manufactured article in step c) by the silk-screen technique.

8. Process to claim 6, wherein the colour penetration reaches a depth up to 2 mm.

9. Vitrified stoneware tiles obtained by the colouring process as claimed in claim 6.

10. Vitrified stoneware tiles obtained by the colouring process as claimed in claim 7.

11. Vitrified stoneware tiles obtained by the colouring process as claimed in claim 6, followed by smoothing for removal of a surface layer to a depth of 1.5 mm, and final polishing.

12. Vitrified stoneware tiles obtained by the colouring process as claimed in claim 7, followed by smoothing for removal of a surface layer to a depth of 1.5 mm, and final polishing.

13. Vitrified stoneware tiles obtained by the colouring process as claimed in claim 6, followed by removal of a 1 to 10 $\mu$ surface layer and final polishing.

14. Vitrified stoneware tiles obtained by the colouring process as claimed in claim 7, followed by removal of a 1 to 10 $\mu$ surface layer and final polishing.

15. The composition as claimed in claim 1, wherein the antimony compound is sodium antimony di-hydroxy-succinate.

* * * * *